United States Patent [19]

Goetzinger et al.

[11] 3,768,989

[45] Oct. 30, 1973

[54] PROCESS FOR THE PREPARATION OF A RARE EARTH OXIDE POLISHING COMPOSITION

[76] Inventors: Nicholas J. Goetzinger, 703 East St.; Walter L. Silvernail, 140 E. Stimmel St., both of Chicago, Ill. 60185

[22] Filed: Sept. 24, 1970

[21] Appl. No.: 75,271

Related U.S. Application Data

[62] Division of Ser. No. 767,556, Aug. 19, 1968, Pat. No. 3,573,886, Division of Ser. No. 476,753, Aug. 2, 1965, abandoned.

[52] U.S. Cl.............. 51/309, 51/293, 51/307, 106/3
[51] Int. Cl................................................ B24d 3/02
[58] Field of Search................. 51/293, 307, 308, 51/309; 106/3

[56] References Cited
UNITED STATES PATENTS

| 3,311,461 | 3/1967 | Silvernail | 51/309 |
| 3,240,580 | 3/1966 | Alexander et al. | 51/309 |
| 2,973,246 | 2/1961 | Harman et al. | 51/309 |
| 2,744,001 | 5/1956 | Harman et al. | 51/308 |
| 2,967,096 | 1/1961 | Kroner | 51/308 |
| 3,262,766 | 7/1966 | Nonamaker | 51/308 |

*Primary Examiner*—Donald J. Arnold
*Attorney*—William G. Addison

[57] ABSTRACT

The Preparation of a rare earth oxide polishing composition by forming a rare earth carbonate-wollastonite precipitate in an aqueous admixture, separating the basic carbonate-wollastonite precipitate from the aqueous admixture and calcining the precipitate to produce an extended rare earth oxide polishing composition.

6 Claims, No Drawings

PROCESS FOR THE PREPARATION OF A RARE EARTH OXIDE POLISHING COMPOSITION

This is a division of application Ser. No. 767,556 filed Aug. 19, 1968 and issued on Apr. 6, 1971 as U.S. Pat. No. 3,573,886.

This invention relates to the polishing art. More particularly, this invention relates to rare earth oxide polishing compositions and processes for preparing the same.

The polishing compositions of this invention comprise a finely divided rare earth oxide containing from a trace, say 0.1 weight per cent, up to about 75 weight per cent of finely divided wollastonite. These wollastonite-containing polishing compositions are conveniently identified herein as "extended" rare earth oxide polishing compositions.

Broadly, the process of this invention for the preparation of both extended and unextended rare earth oxide polishing compositions comprises:

a. preparing a liquid admixture comprising carbonate ions and rare earth ions;

b. forming solid rare earth carbonate in said liquid admixture:

c. hydrolyzing the rare earth carbonate precipitate to produce rare earth basic carbonate precipitate in the liquid admixture;

d. separating the basic carbonate precipitate from the liquid admixture; and e. calcining the basic carbonate to produce a rare earth oxide polishing composition.

Steps (b) and (c) may be carried out simultaneously so that the initial precipitate is rare earth basic carbonate.

Preferably, the liquid admixture, which comprises carbonate ions and rare earth ions, is an aqueous admixture containing at least about the stoichiometric amount of rare earth ions required to produce normal or basic rare earth carbonate. Any excess of sodium or other alkali ions tends to detract from the quality of the resultant rare earth oxide polishing composition. Such alkali metal ions may be carried into the liquid admixture as the cation associated with the carbonate. This aqueous admixture is conveniently prepared by admixing a solution which contains dissolved carbonate ions with a solution which contains dissolved rare earth ions. Preferably, there is an excess of some anion in the liquid admixture which will combine with any alkali metal ions so that the basic carbonate precipitate is substantially free of alkali metal ions.

Convenient sources of rare earth ions include soluble rare earth compounds such as, for example, rare earth sulfate, rare earth nitrate, rare earth chloride and the like.

It will be understood that the term "rare earth" used herein includes those elements of the lanthanide series having atomic numbers from 57 through 71 inclusive, as well as the elements thorium, yttrium and scandium which often occur naturally with the rare earth elements. Conveniently, the term "rare earth" is abbreviated herein as "Ln".

The rare earth carbonate which is formed by the reaction of carbonate ions with rare earth ions is generally a mixture of carbonates including hydrated double carbonate-$Na_2CO_3:Ln_2(CO_3)_3 \cdot XH_2O$-, hydrated normal carbonate -$Ln_2(CO_3)_3 \cdot XH_2O$-, anhydrous double carbonate, anhydrous normal carbonate and basic carbonate -$LnOHCO_3$-. This rare earth carbonate is generally a relatively slow settling solid in the liquid admixture, which characteristic makes separation of it from the liquid admixture rather difficult.

The settling rate of the rare earth carbonate may be improved somewhat by heating the liquid admixture during the precipitation of the rare earth carbonate. The settling rate of the rare earth carbonate generally increases in proportion to the temperature at which the liquid admixture is heated during its precipitation. The liquid admixture may be heated, during the precipitation of the rare earth carbonate, at temperatures ranging from ambient up to the boiling point of the admixture. Conveniently, during the precipitation of the rare earth carbonate the liquid admixture may be heated sufficiently to cause the precipitate to form initially as the rare earth basic carbonate. In order to accomplish this it is necessary to heat the liquid admixture to a temperature at or near, say within 10° C. of its boiling point.

When the rare earth carbonate precipitate which is formed in the liquid admixture is not hydrolyzed during its formation, hydrolysis is conveniently accomplished by boiling the liquid admixture which contains the rare earth carbonate. Hydrolysis can be accomplished at temperatures as much as 40° C. below the boiling point, that is above about 60° C., but the rate is considerably increased by heating at about the boiling point.

The conversion of the rare earth carbonate to the rare earth basic carbonate precipitate is essential in the production of a satisfactory rare earth oxide polishing composition. Also, this conversion step is important in facilitating the separation of the rare earth containing precipitate from the liquid admixture. The rare earth carbonate is generally relatively slow settling and may be so gelatinous as to be very difficult to separate from the liquid admixture by conventional procedures. By contrast, the rare earth basic carbonate precipitate is a relatively fast settling tractable precipitate which is readily separable from the liquid admixture Separation of the rare earth basic carbonate precipitate from the liquid admixture may be accomplished by conventional solid-liquid phase separation techniques including, for example, filtration, centrifuging, sedimentation and the like.

When the hydrolysis of the rare earth carbonate is accomplished by boiling the liquid admixture, the boiling should be carried out for a period of time sufficient to hydrolyze substantially all of the rare earth carbonate. This time ranges from about 15 minutes or less to about 4 hours or more, generally from about ½ to 1-½ hours. In general, those precipitates which have been boiled for the longer periods of time are easiest to separate from the liquid admixture.

The rare earth basic carbonate precipitate, which should be essentially free from excess alkali metal ions, is converted to rare earth oxide by calcination. The calcining operation may be carried out at temperatures ranging from about 1,200° to 2,000° F. In general, the most satisfactory rare earth oxide polishing compositions are produced at calcining temperatures of from about 1,450° to 1,850° F.

The polishing characteristics of the rare earth composition resulting from the calcining operation may be enhanced somewhat by subjecting it to an acid leach with a mineral acid. This acid leaching step is particularly important if any substantial amount of excess cations such as sodium, potassium, ammonium, and the like ions are present in the rare earth basic carbonate precipitate at the time it is calcined.

Acid leaching will convert a cation contaminated rare earth oxide from an unsatisfactory polish to one which is very satisfactory. The improvements in the polishing characteristics of uncontaminated rare earth oxides are not as great, although acid leaching does improve them significantly. When using an acid leach it is even possible to use small excesses of cations in the liquid admixture from which the rare earth carbonate is precipitated.

Surprisingly, it has been discovered that a certain extender may be added to rare earth oxide polishing compositions to substantially reduce the amount of rare earth oxide required, without altering significantly the polishing characteristics of these compositions. In particular, it has been found that the incorporation of up to about 80 per cent by weight of a rare earth oxide polishing composition of calcium metasilicate (wollastonite) does not detract from the polishing characteristics of this composition. In fact, these extended rare earth oxide polishing compositions may even have enhanced polishing characteristics.

The manner in which the wollastonite is incorporated with the rare earth oxide is critical. Direct admixture of wollastonite with calcined rare earth oxide will result in a composition which has somewhat impaired polishing characteristics.

Therefore, in producing an extended rare earth oxide polishing composition in accordance with this invention, it is essential that the wollastonite be slurried with the liquid admixture during the precipitation of the rare earth carbonate. Admixture of the wollastonite at any point in the process after the rare earth carbonate has been completely formed will result in a composition which exhibits inferior polishing behavior.

Unexpectedly, the extended rare earth oxide polishing compositions can tolerate substantial quantities of excess cations such as sodium or potassium ions, unlike the unextended compositions.

The polishing behavior of the extended rare earth oxide polishing compositions may be enhanced substantially by subjecting the wollastonite to an acid leach with a mineral acid prior to incorporating it in the polishing composition.

The improved polishing characteristics of wollastonite extended rare earth oxides appear to be limited specifically to wollastonite. Other materials such as zircon, pumice and talc adversely affect the polishing characteristics of the composition.

The polishing characteristics of the extended rare earth oxide compositions of this invention may be enhanced somewhat by milling the calcined composition. Milling may be accomplished in any convenient device such as, for example, a ball mill, a vibro energy mill, a fluid energy mill or the like. The average particle size of the polishing composition should range from about 0.5 to 20 microns.

In the specification, appended claims and following examples, all parts and percentages are by weight unless otherwise indicated. The following examples are submitted to illustrate and not to limit the invention.

EXAMPLE I

This example is illustrative of the general sequence of steps employed in the preparation of the polishing compositions of this invention.

Six liters of rare earth sulfate solution containing the equivalent of 343.2 grams of rare earth oxide (1.045 moles) having the analysis $La_2O_3$, 22 percent; $CeO_2$, 47 percent; $Pr_6O_{11}$, 6 percent; $Nd_2O_3$, 19 percent; $Sm_2O_3$, 3 percent; other, 3 percent, is added at a uniform rate to 333.2 grams (3.14 moles) of sodium carbonate in 1.57 liters of distilled water. The sodium carbonate solution is maintained at a temperature of 80° C. during the addition. The addition of the rare earth sulfate solution to the sodium carbonate solution is accomplished over a period of 1.5 hours. The resultant rare earth carbonate slurry is allowed to digest at 80° C. for an additional ½ hour. The resultant slurry is divided into four equal portions. The first portion is not boiled. The second portion is boiled for 0.5 hours, the third for 1 hour and the fourth for 2.0 hours. The unboiled portion of the slurry settles very slowly and the solids are difficult to separate from the liquid. The solids in each of those portions of the slurry which have been boiled settle very rapidly and are quite tractable. Boiling hydrolyzes the rare earth carbonates to rare earth basic carbonates. The resultant slurries are washed with distilled water, filtered and dried at 110° C. overnight. Each of these 4 dried precipitates is ignited at a temperature of 1,550° C. for a period of 2 hours to produce a rare earth oxide polishing composition.

The polishing speeds of each of these 4 compositions is determined by measuring the rate of glass removal using a 54 millimeter plano crown glass blank, polished in a conventional spherical ophthalmic machine, using a plano tool fitted with a felt lap, revolving at 475 revolutions per minute with the glass held on the lap at a pressure of 0.20 kilograms per square centimeter. Relative polishing speeds are determined by comparing the average weight loss from the glass blanks. A polishing speed of 10 is considered to be a good commercially acceptable rate. This rate corresponds to the removal of 0.00394 grams of glass per minute from the glass blank.

The rare earth oxides resulting from the calcination of the precipitates which had been boiled for periods of 0, 0.5, 1 and 2 hours give the respective polishing speeds of 7.0, 10.2, 10.6 and 10.7. The results of this example indicate the importance of hydrolysis in obtaining good polishing rates.

Substantially the same polishing speeds are obtained when cerrous sulfate is substituted for the rare earth sulfate in this example.

This example is repeated using substantially the same procedure except that the aqueous slurry is maintained at a temperature of about 25° C. during the precipitation of the rare earth carbonate. The resultant solid rare earth carbonate settles much more slowly than that obtained when the aqueous admixture is maintained at 80° C. Substantially the same polishing speeds are obtained using those rare earth oxides which are initially precipitated at 25° C. as are obtained using an initial precipitation temperature of 80° C.

Example I is repeated using a cerium free rare earth sulfate solution. The resultant rare earth oxide polishing compositions exhibit very low polishing speeds and are generally unsatisfactory polishes.

The rare earth sulphate solution used in the process of Example I contains that mixture of rare earths which occurs naturally in monazite ore. Naturally occurring mixtures of rare earths derived from ores other than monazite may be used, for example, the mixture derived from bastnasite may be used. The natural ratio of rare earths in bastnasite is about $La_2O_3$, 26 percent; $CeO_2$, 50 percent; $Pr_6O_{11}$, 5 percent; $Nd_2O_3$, 16 percent; $Sm_2O_3$, 2 percent; all others, 1 percent.

EXAMPLE II

This example is illustrative of the influence of stoichiometry on the polishing speed of non-extended rare earth oxide polishing compositions.

The rare earth oxide polishing compositions of this example are prepared according to the general procedures outlined in Example I, above. The rare earth carbonates are precipitated at a temperature of 80° C. and the addition of the rare earth sulphate solution to the sodium carbonate solution is accomplished at a uniform rate over a period of 1 hour. After the addition of the rare earth sulphate is complete, the resultant slurry is digested for an additional ½ hour. The samples of rare earth carbonate are hydrolyzed by boiling them for 1 hour to produce rare earth basic carbonates. Various proportions of rare earth sulphate solution and sodium carbonate solution are used in different samples so that the effect of the variation of the $Na_2CO_3$; $Ln_2O_3$ mole ratio over a range of 2.0 to 4.0 is determined. At mole ratios of from about 2.0 to 3.0 polishing speeds in excess of 10 are obtained. At a $Na_2CO_3$; $Ln_2O_3$ mole ratio of 3.05 the polishing speed drops to a value of 8.7 and at a mole ratio of 3.3 the polishing speed drops to a value of 4.4. The rapid drop-off in polishing speeds with a $Na_2CO_3$: $Ln_2O_3$ mole ratio of three and up indicates that the presence of even small amounts of excess sodium ion are detrimental to the polishing speed of the resultant rare earth oxide polishing composition.

In order to insure that there is no excess sodium or potassium ion in the unextended rare earth oxide polishing compositions, a slight excess of anion, generally that accompanying the rare earth ion, should be used in the aqueous admixture from which the rare earth carbonate is precipitated.

EXAMPLE III

This example is illustrative of the effects of a mineral acid leach on rare earth oxide polishing compositions.

A portion of the rare earth oxide polishing composition prepared in Example II with a $Na_2CO_3$: $Ln_2O_3$ mole ratio of 3.30 is leached with hydrochloric acid. A rare earth oxide polishing composition prepared using a mole ratio of 2.90 is similarly treated for purposes of comparison. In each case, 20 grams of the polishing composition is slurried in 400 milliliters of distilled water. The composition is leached by adding 1:1 HCl until the pH of the mixture declines to a value of 7. The 3.30 mole ratio sample requires 5.7 milliliters of acid compared to the 0.5 milliliters of acid required for the 2.90 mole ratio sample. Each sample is washed by decantation several times with distilled water. Polishing speeds are determined and compared to the speeds previously obtained from other portions of the samples which were not leached. The 3.30 mole ratio samples show an increase in polishing speed from 4.4 to 10.0 as a result of the acid leaching while the 2.90 mole ratio samples show an increase in polishing speed of from 10.0 to 12.3.

Repetition of this example twice, using respectively nitric acid and sulphuric acid results in substantially the same improvements in polishing speeds.

EXAMPLE IV

This example is illustrative of the influence of calcination time and temperature on the rare earth oxide polishing compositions of this invention.

A five liter portion of rare earth sulphate solution containing 290.5 grams of $Ln_2O_3$ (0.887 moles) is added to 1.3 liters of sodium carbonate solution containing 282.1 grams (2.66 moles) of sodium carbonate at a uniform rate over a period 1.5 hours. The resultant aqueous admixture is maintained at a temperature of 80° C. throughout this period of time. The resultant slurry is allowed to digest for an additional ½ hour at a temperature of 80° C. After this digestion the precipitated rare earth carbonate is hydrolyzed by boiling the aqueous admixture for 1 hour. The resultant solid rare earth basic carbonate is washed with distilled water, filtered, then dried at 110° C. overnight. The rare earth basic carbonate sample is divided into several portions each of which is converted to the oxide by calcining at temperatures ranging from 1,200° to 2,000° F. for periods of time ranging from ½ to 2 hours. The polishing speeds of the resultant compositions are then determined. The results of these polishing tests indicate that the optimum temperature for calcination is about 1,550° F. Between about 1,450° F. and 1,650° F. the calcination temperature does not influence the polishing speed to any substantial degree. Polishing rates are considerably reduced at calcination temperatures of 1,200° F. and 2,000° F. Generally, the shorter calcination times of ½ to 1 hour give slightly higher polishing rates, although the calcination time does not appear to be critical, so long as calcination is carried out for a period of time sufficient to convert substantially all of the basic carbonate to the oxide.

Repetition of this example using a wollastonite extended rare earth oxide polishing composition indicates that optimum polishing rates are obtained at slightly higher calcination temperatures. Calcination temperatures of from about 1,650° to 1,950° F. give the most satisfactory polishing rates for these wollastonite extended polishing compositions. As with the unextended polishing compositions, the calcination time does not appear to be critical so long as the conversion to the oxide is substantially complete.

In two repetitions of Example IV the sodium carbonate is replaced respectively with ammonium carbonate and potassium carbonate. In each instance results substantially similar to those in Example IV are obtained, indicating that the source of soluble carbonate used in this process is not critical.

EXAMPLE V

This example is illustrative of the use of a rare earth chloride feed solution for the preparation of rare earth oxide polishing compositions.

Rare earth carbonates are precipitated in three separate examples using $Na_2CO_3$: $Ln_2O_3$, mole ratios of 2.95, 3.00, and 3.05 respectively. In each instance 1.5 liters of rare earth chloride solution containing 107.1 grams (0.327 moles) of $Ln_2O_3$ is added to a 2 molar sodium carbonate solution at a uniform rate over a period of 1 hour. The sodium carbonate solution is maintained throughout this period of time at its boiling point. The respective weights and moles of sodium carbonate used in each example are 102.1 grams (0.964 moles), 103.9 grams (0.978 moles) and 105.6 grams (0.995 moles). The resultant slurries are boiled for 1 additional hour after precipitation is complete. This insures that the rare earth carbonates in the resultant slurries are completely hydrolyzed to the rare earth basic carbonate. The final pH values of the boiled slurries are respectively: 6.7, 8.4, and 8.6. It is evident from these pH values that the small difference in mole ratio between 2.95 and 3.00 results in an excess of sodium ions. The basic carbonate precipitates are converted to oxides by calcining at 1,550° F. for 2 hours. The rare earth oxide resulting from that rare earth carbonate which is prepared using a mole ratio of 2.95 exhibits a polishing speed of 11, while that prepared at a mole ratio of 3.00 is 9.5, and that prepared at a mole ratio of 3.05 is 8.5. From these results it is evident that the polishing rates of compositions prepared from rare earth chloride feed solutions are comparable to those obtained from rare earth sulfate feed solutions. Also, those polishes prepared from chloride feed solutions are as sensitive to excess sodium ions as are those prepared from rare earth sulphate feed solutions.

Substantially equivalent results are obtained when rare earth nitrate feed solutions are used in place of the rare earth chloride feed solution of this example. This illustrates that the source of the rare earth ions is not particularly critical.

Repetition of Example V using cerous chloride in place of the mixture of rare earth chlorides results in substantially equivalent polishing results. An unsatisfactory polish results when a mixture of rare earth chlorides is used that does not contain cerous chloride.

EXAMPLE VI

This example is illustrative of the preparation of the wollastonite extended polishing compositions of this invention.

An 880 gram quantity of anhydrous sodium carbonate is slurried in two liters of hot tap water. A 910 gram quantity of wollastonite is thoroughly dispersed in this sodium carbonate solution and 16 liters of rare earth sulphate solution containing 896 grams of $Ln_2O_2$ are added to this slurry at a uniform rate over a period of 1-½ hours. The resultant slurry is quite yellow and has a pH of 8.0 compared to the usual value of 6.5 to 7.0 when no wollastonite extender is present. The resultant rare earth carbonate-wollastonite slurry is boiled for 1-½ hours during which time its color changes to white and the rare earth carbonate is converted to rare earth basic carbonate. After washing thoroughly with hot tap water, the slurry is filtered and dried at 120° C. overnight. When ignited at 1600° F. for 1.5 hours the resultant wollastonite extended rare earth oxide polishing composition exhibits a polishing speed of 10.0.

Repetition of this example using cerous chloride in place of the rare earth sulfate results in a polishing composition which exhibits a polishing speed of 14.7.

This example VI is repeated except that zircon is substituted for the wollastonite. The resultant rare earth oxide-zircon polishing composition exhibits a polishing speed of 8.0. Repetition of this Example VI using pumice, feldspar and talc, respectively, in place of the wollastonite results in each instance in substantially decreased polishing rates. This indicates that the extender characteristics of wollastonite are unique to this material.

Repetition of this Example VI adding the wollastonite after the rare earth carbonate has been precipitated results in a polishing composition which exhibits substantially reduced polishing rates. This indicates that it is necessary to have the wollastonite present at the time the rare earth carbonate is precipitated.

EXAMPLE VII

This example is illustrative of wollastonite extended polishing compositions of this invention which contain varying amounts of wollastonite.

A wollastonite extended composition is prepared according to the procedures described in Example VI above except that the proportions of wollastonite in the composition are varied from 0 to 100 percent. For compositions containing from 0 to about 70 weight per cent of wollastonite, the polishing speeds remain at about a constant value of 10. As the proportion of wollastonite in the composition is increased beyond about 70 percent, the polishing rate begins to decrease rapidly. At 80 weight per cent wollastonite, the polishing speed of the composition has decreased to a value of about 6, and at 100 weight per cent wollastonite the polishing rate is below about 3. The results of this experiment indicate that the amount of wollastonite in the composition should not exceed about 75 weight per cent. Preferably the amount of wollastonite in the composition should not exceed 70 per cent.

This Example VII is repeated except that the wollastonite in each instance is pretreated by milling it in a fluid energy mill and by slurring it for 10 minutes with one normal hydrochloric acid followed by a water wash to remove any excess acid. In each instance the respective polishing speeds are increased with the maximum polishing speed obtained being in excess of 12.0.

EXAMPLE VIII

This example is illustrative of the effect of excess sodium ion on wollastonite-extended polishing compositions.

The procedures of Example VI above are repeated except that the sodium carbonate quantity is varied from 83 to 117 mole per cent of the stoichimetric amount required to produce $Ln_2(CO_3)_3$. The polishing speeds of the resultant wollastonite rare earth oxide polishing compositions range from 11.6 to 9.9 showing that, unlike the unextended rare earth oxide polishing compositions, the quantity of sodium ions in these extended compositions is not particularly critical.

As will be understood by those skilled in the art what has been described are the presently preferred embodiments of the invention; however, many modifications, changes and substitutions can be made therein without departing from the scope and the spirit of the following claims.

What is claimed is:

1. A process for the preparation of an extended rare earth oxide polishing composition which comprises:
   a preparing an aqueous admixture containing carbonate ions, rare earth ions and from about 0.1 to 75 weight percent wollastonite;
   b forming a rare earth carbonate-wollastonite precipitate in said aqueous admixture at a temperature of from ambient up to the boiling temperature of the admixture;

c converting said rare earth carbonate to a basic carbonate-wollastonite precipitate by boiling said aqueous admixture for a time of from about ½ to 1 ½ hours;

d separating said basic carbonate-wollastonite precipitate from said aqueous admixture; and e calcining said basic carbonate at a temperature of from about 1,200° F. to 2,000° F. to produce an extended rare earth oxide polishing composition.

2. The process of claim 1 wherein said basic carbonate-wollastonite precipitate is calcined at a temperature of from about 1,450° to 1,850° F.

3. The process of claim 1 wherein said wollastonite is present in an amount of about 70 percent.

4. The process of claim 3 wherein said basic carbonate-wollastonite precipitate is calcined at a temperature of about 1,650° to 1,950° F.

5. A process for the preparation of an extended rare earth oxide polishing composition which comprises:

a preparing an aqueous admixture containing carbonate ions, rare earth ions and from about 0.1 to 75 weight percent wollastonite;

b forming a basic carbonate-wollastonite precipitate by heating said aqueous admixture to a temperature within about 10° C. of its boiling point for a time of from about ½ to 1 ½ hours;

c separating said basic carbonate-wollastonite precipitate from said aqueous admixture; and d calcining said basic carbonate at a temperature of from about 1,200° F. to 2,000° F. to produce an extended rare earth oxide polishing composition.

6. The process of claim 5 wherein the said wollastonite is present in an amount of about 70 percent and said basic carbonate-wollastonite precipitate is calcined at a temperature of about 1,650° to 1,950° F.

* * * * *

UNITED STATES PATENT OFFICE
CERTIFICATE OF CORRECTION

Patent No. 3,768,989　　　　　　　Dated October 30, 1973

Inventor(s) Nicholas J. Goetzinger and Walter L. Silvernail

It is certified that error appears in the above-identified patent and that said Letters Patent are hereby corrected as shown below:

Page 1, line 2 of the Abstract of the Disclosure following "forming a rare earth" insert -- basic --

Signed and sealed this 27th day of August 1974.

(SEAL)
Attest:

McCOY M. GIBSON, JR.
Attesting Officer

C. MARSHALL DANN
Commissioner of Patents